United States Patent [19]

Kramer

[11] Patent Number: 5,138,000

[45] Date of Patent: Aug. 11, 1992

[54] CURABLE COMPOSITIONS BASED ON AROMATIC BISMALEIMIDES

[75] Inventor: Andreas Kramer, Düdingen, Switzerland

[73] Assignee: Ciba-Geigy Corporation, Ardsley, N.Y.

[21] Appl. No.: 482,143

[22] Filed: Feb. 20, 1990

[30] Foreign Application Priority Data

Feb. 28, 1989 [CH] Switzerland ............ 734/89
Sep. 22, 1989 [CH] Switzerland ........... 3444/89

[51] Int. Cl.$^5$ ............................ C08F 22/40
[52] U.S. Cl. ............................ 526/262
[58] Field of Search ........................ 526/262

[56] References Cited

U.S. PATENT DOCUMENTS

| | | | |
|---|---|---|---|
| 4,100,140 | 7/1978 | Zahir et al. ............ | 526/90 |
| 4,288,583 | 9/1981 | Zahir et al. ............ | 526/262 |
| 4,371,719 | 2/1983 | Zahir et al. ............ | 568/723 |
| 4,689,378 | 8/1987 | Chaudhari et al. ...... | 526/259 |
| 4,749,767 | 6/1988 | Chaudhari et al. ...... | 528/170 |
| 4,835,232 | 5/1989 | Schornick et al. ...... | 526/262 |
| 4,873,284 | 10/1989 | Ihemann ................ | 524/548 |
| 5,013,804 | 3/1991 | Kramer ................. | 526/262 |

FOREIGN PATENT DOCUMENTS 61-93159 5/1986 Japan .

Primary Examiner—J. L. Schoter
Assistant Examiner—Alex H. Walker
Attorney, Agent, or Firm—Harry Falber

[57] ABSTRACT

Curable compositions comprising
(a) an aromatic bismaleimide of formula

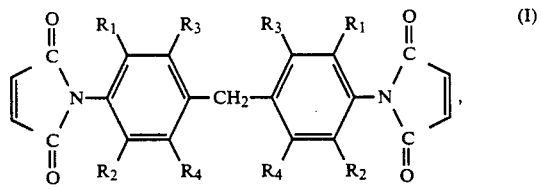

wherein $R_1$ and $R_2$ are identical or different and each is $C_1$–$C_4$alkyl, and $R_3$ and $R_4$ are each independently of the other a hydrogen or halogen atom, or a mixture of an aromatic bismaleimide of formula I and N,N'-4,4'-methylenebis(phenylmaleimide), (b) an alkenyl phenol, an alkenyl phenol ether or a mixture thereof, with the proviso that the alkenyl moiety contains at least 3 carbon atoms, are readily processable, well suited for the fabrication or prepregs or fibre-reinforced composites, and give mouldings having excellent ultimate strength.

13 Claims, No Drawings

CURABLE COMPOSITIONS BASED ON AROMATIC BISMALEIMIDES

The present invention relates to curable compositions comprising (a) an aromatic alkyl-substituted bismaleimide or a mixture of an aromatic alkyl-substituted bismaleimide and N,N'-4,4'-methylenebis(phenylmaleimide) and (b) an alkenylphenol or alkenyl phenol ether and to the crosslinked, infusible products obtained therefrom by curing.

Curable compositions based on aromatic bismaleimides and alkenyl phenols are known, for example, from German Offenlegungsschrift 2 627 045 and European patent specifications 14 816 and 227 598. Whereas in German Offenlegungsschrift 2 627 045 and European patent specification 14 816 bismaleimides of the N,N'-4,4'-methylenebis(phenylmaleimide) type are preferably used, the curable compositons of European patent 227 598 contain a phenylindane bismaleimide. These known curable compositions are not satisfactory with regard to their processability, especially in the melt.

It has now been found that the use of aromatic methylenebisnphenylmaleimides) which are alkyl-substituted in o,o'-position to the imide group are more readily miscible with alkenyl phenols and alkenyl phenol ethers, and that such curable compositions have longer, i.e. more favourable, processing times (pot life) at elevated temperature, for example at 120° C. It has further been found that mixtures of the aromatic methylene bis(phenylmaleimides) which are alkyl-substituted in o,o'-position to the imide group and N,N'-4,4'-methylenebis(phenylmaleimide) afford additional advantages, as mixtures can be prepared therefrom with alkenyl phenols or alkenyl phenol ethers even at 100° C. The moulded articles prepared from the curable compositions of this invention have, in addition, enhanced toughness properties and enhanced moisture resistance.

Accordingly, the present invention relates to curable compositions comprising (a) an aromatic bismaleimide of formula I

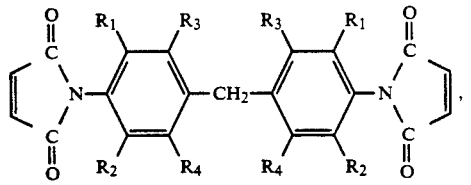

wherein $R_1$ and $R_2$ are identical or different and each is $C_1$-$C_4$alkyl, and $R_3$ and $R_4$ are each independently of the other a hydrogen or halogen atom, or a mixture of an aromatic bismaleimide of formula I and N,N'-4,4'-methylenebis(phenylmaleimide) in the molar ratio of 1:0.3 to 1.2, and (b) an alkenyl phenol, an alkenyl phenol ether or a mixture thereof, with the proviso that the alkenyl moiety contains at least 3 carbon atoms.

Component (a) of the compositons of this invention is preferably an aromatic bismaleimide of formula I, and component (b) is an alkenyl phenol, an alkenyl phenol ether or a mixture thereof, with the proviso that the alkenyl moiety contains at least 3 carbon atoms.

The compositions of this invention normally contain 0.05 to 2 mole, preferably 0.5 to 1.2 mole, of component (b) per mol of component (a).

The compositions of this invention preferably contain as component (a) those aromatic bismaleimides of formula I, wherein $R_1$ and $R_2$ are each independently of the other methyl, ethyl or isopropyl, and $R_3$ and $R_4$ are each a hydrogen or a chlorine atom.

Most preferably, the compositions of this invention contain those bismaleimides of formula I, wherein $R_1$ and $R_2$ are each independently of the other methyl, ethyl or isopropyl, and $R_3$ and $R_4$ are each a hydrogen atom.

If component (a) of the compositions of the invention is a mixture of an aromatic bismaleimide of formula I and N,N'-4,4'-methylenebis(phenylmaleimide), then these compounds are present in a molar ratio of 1:0.9 to 1.1, preferably of 1:1.

Suitable bismaleimides of formula I are typically
N,N'-4,4'-methylenebis(2-ethyl-6-methylphenylmaleimide),
N,N'-4,4'-methylenebis(2,6-dimethyphenylmaleimide),
N,N'-4,4'-methylenebis(2,6-diethylphenylmaleimide),
N,N'-4,4'-methylenebis(2,6-diisopropylphenylmaleimide),
N,N'-4,4'-methylenebis(2-ethyl-6-isopropylphenylmaleimide), and
N,N'-4,4'-methylenebis(3-chloro-2,6-diethylphenylmaleimide).

Some of the bismaleimides of formula I are known compounds and can be prepared, for example, by the process disclosed in Japanese Patent Kokai Sho 61-93159 by reacting 1 mol of a diamine of formula Ia

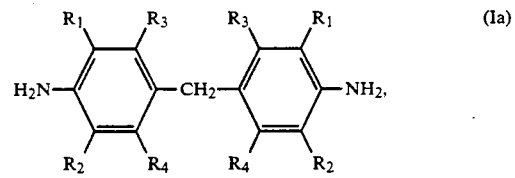

wherein $R_1$, $R_2$, $R_3$ and $R_4$ are as defined for formula I, with 2 mol of maleic anhydride, in an organic solvent, to the corresponding bismaleamic acid, and subsequently cyclising said acid with a condensing agent such as acetic anhydride, to the bismaleimide.

The diamines of formula Ia are known compounds and are disclosed, for example, in German Offenlegungsschrift 2 339 237 or in European patent application 0 171 588.

As mentioned at the outset, mixtures of an aromatic bismaleimide of formula I and N,N'-4,4'-methylenebis(phenylmaleimide) are especially advantageous for processing with alkenyl phenols or alkenyl phenol ethers. Hence the invention also relates to mixtures of an aromatic bismaleimide of formula I and N,N'-4,4'-methylenebis(phenylmaleimide) in the molar ration of 1:0.3 to 1.2.

Alkenyl phenols or alkenyl phenol ethers (b) suitable for the compositions of this invention may be mononuclear as well as preferably binuclear alkenyl phenols and alkenyl phenol ethers. Preferably at least one nucleus contains as alkenyl group as well as a phenolic free or etherified OH group.

It is known that alkenyl phenols can be prepared by rearrangement of alkenyl ethers of phenols (for example of allyl phenyl ether) by the action of heat (Clausen rearrangement). These alkenyl ethers can also be prepared in known manner by reacting phenols and, for example, allyl chloride in the presence of an alkali metal hydroxide in a solvent.

The compositions of the invention preferably contain as component (b) an alkenyl phenol of formula II, III or IV

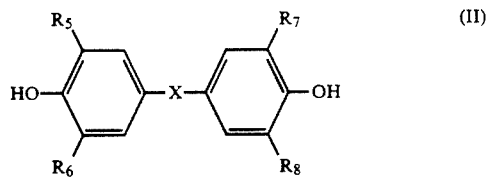

wherein X is a direct bond, methylene, isopropylidene, —O—, —S—, —SO—, —SO$_2$— or —CO—, and $R_5$, $R_6$, $R_7$ and $R_8$ are each independently of the other a hydrogen atom or $C_3$–$C_{10}$alkenyl, with the proviso that at least one of the substituents $R_5$ to $R_8$ is an alkenyl group,

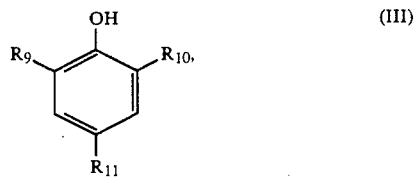

wherein $R_9$, $R_{10}$ and $R_{11}$ are each independently of the other a hydrogen atom or $C_3$–$C_{10}$alkenyl, with the proviso that at least one of the substituents $R_9$ to $R_{11}$ is an alkenyl group, or

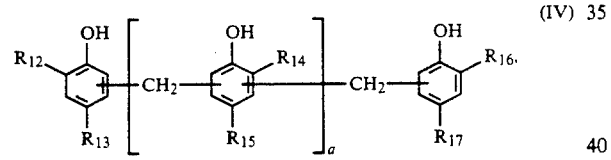

wherein $R_{12}$, $R_{13}$, $R_{14}$, $R_{15}$, $R_{16}$ and $R_{17}$ are each independently of the other a hydrogen atom, $C_1$–$C_4$alkyl or $C_3$–$C_{10}$alkenyl, with the proviso that at least one of $R_{12}$ to $R_{17}$ is alkenyl, and a is an integer from 0 to 10, or ethers of the compounds of formulae II to IV which contain a $R_{18}$O radical instead of at least one OH group, where $R_{18}$ is $C_1$–$C_{10}$alkyl, $C_6$–$C_{10}$aryl or $C_3$–$C_{10}$alkenyl.

The compounds of formulae II to IV preferably contain an allyl, methallyl or propenyl group as alkenyl group.

Of the compounds of formulae II to IV, it is preferred to use compounds of formula II in the compositions of this invention, especially those wherein X is methylene isopropylidene, —O—, —SO$_2$— or —CO—, $R_5$ and $R_7$ are each allyl and $R_6$ and $R_8$ are each a hydrogen atom.

Alkenyl-substituted phenols and polyols are described in U.S. Pat. Nos. 4,100,140 and 4,371,719. Typical compounds are: o,o'-diallyl bisphenol A, 4,4'-dihydroxy-3,3'-diallylbiphenyl, bis(4-hydroxy-3-allylphenyl)methane, 2,2-bis(4-hydroxy-3,5-diallylphenyl)propane, eugenol (4-allyl-2-methoxyphenol), o,o'-dimethallyl bisphenol A, 4,4'-dihydroxy-3,3'-dimethallylbiphenyl, bis(4-hydroxy-3-methallylphenyl)methane, 2,2-bis(4-hydroxy-3,5-dimethallylphenyl)propane, 4-methallyl-2-methoxyphenol, 2,2-bis(4-methoxy-3-allylphenyl)propane, 2,2-bis(4-methoxy-3-methallylphenyl)propane, 4,4'-dimethoxy-3,3'-diallylphenyl, 4,4'-dimethoxy-3,3'-dimethyallylbiphenyl, bis(4-methoxy-3-allylphenyl)methane, bis(4-methoxy-3-methallylphenyl)methane, 2,2-bis(4-methoxy-3,5-diallylphenyl)propane, 2,2-bis(4-methoxy-3,5-dimethallylphenyl)propane, 4-allylveratrol (4-allyl-1,2-dimethoxybenzene) and 4-methallylveratrol (4-methallyl-1,2-dimethoxybenzene) and 4-methallylveratrol (4-methallyl-1,2-dimethoxybenzene). A particularly preferred compound is o,o'-diallyl bisphenol A.

In the practice of this invention it is also possible to use mixtures of isomers of propenyl- and allyl-substituted monohydric or polyhydric phenols. It is preferred to use mixtures of propenyl- and allyl-substitued phenols of formula II, especially those of formula IIa

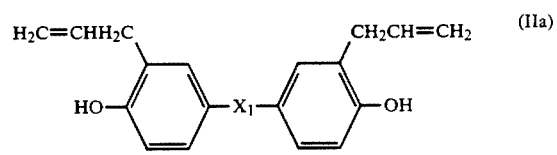

wherein $X_1$ is methylene, isopropylidene or O.

Mixtures of polynuclear alkenyl phenols and/or alkenyl phenol ethers with mononuclear alkenyl phenols and/or alkenyl phenol ethers also give good results.

It is also possible to use mixtures of compounds which contain only one OH group and only one alkenyl group on the aromatic nucleus with compounds which contain several OH groups and/or several alkenyl groups on the aromatic nucleus, or mixtures of the corresponding phenol ethers of these compounds. The corresponding methallyl compounds can also be used.

Component (b) of the compositions of this invention may also suitable be alkenyl phenols of formula V

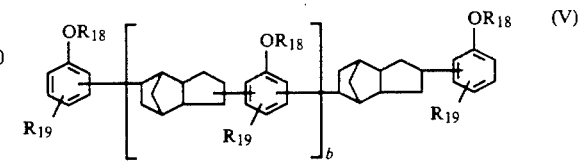

wherein either $R_{18}$ is $C_3$–$C_6$alkenyl and $R_{19}$ is a hydrogen atom, or $R_{18}$ is a hydrogen atom and $R_{19}$ is $C_3$–$C_6$alkenyl, and b is a value greater than 0, preferably from 0.1 to 3.0.

The compounds of formula V are known and are described in more detail, for example, in European patent application 0 276 733.

The compositions of this invention may contain an amine (c) as further reactive compound. Suitably amines with which the compositions may be modified are typically aliphatic, cycloaliphatic or aromatic primary or secondary amines. It is preferred to use aromatic amines, preferably $C_6$–$C_{10}$arylenediamines, for example p-phenylenediamine, m-phenylenediamine, bis(4-aminophenyl)methane and diaminophenylindane.

If the compositions additionally contain an amine, said amine will normally be present in the molar ratio of 1:0.1 to 0.1:1, based on component (b). In this case, the compositions will usually contain 0.05 to 2 mol of the mixture of component (b) and component (c) per mol of component (a).

Typical amines which may be added to the compositions of this invention are: monoethanolamine, ethylenediamine, hexamethylenediamine, trimethylhexamethylenediamine, diethylenetriamine, triethylenetetramine, tetraethylenepentamine, N,N-dimethylpropylene-1,3-diamine, N,N-diethylpropylene-1,3-diamine, bis-(4-amino-3-methylcyclohexyl)methane, bis(4-aminocyclohexyl)methane, 2,2-bis(4-aminocyclohexyl)propane, 3,5,5-trimethylcyclohexylamine, N-aminoethylpiperazine, m-phenylenediamine, p-phenylenediamine, bis(4-aminophenyl)methane, bis(4-aminophenyl)sulfone, m-xylylenediamine, 1,2-diaminocyclohexane, 1,4-diaminocyclohexane, 1,3-bis(aminomethyl)cyclohexane, 1,4-bis(aminomethyl)cyclohexane, isophoromediamine, (3-aminomethyl-3,5,5-trimethylhexylamine), 1-methylimidazole and diaminophenylindane. Polyamides may also be used and are included within the definition of the amines for the purposes of this invention.

The compositions of this invention may be prepared by merely mixing the components or by heating the mixture at a temperature in the range from 75°-130° C. for about 15 to 60 minutes. Solvents, preferably highly volatile solvents such as chlorinated hydrocarbons, esters, ether alcohols or tetrahydrofuran, may also be used to facilitate the reaction. The solvent is removed after the reaction.

Curing of the compositions is usually effected in the temperature range from 100°-250° C. for the appropriate period of time.

Upon curing, a network of high crosslink density occurs. Accordingly, the expression "cure" as used herein denotes the conversion of compositions into insoluble and infusible crosslinked products with simultaneous shaping to give shaped articles such as castings, pressings or laminates, or to give two-dimensional structures such as coatings, enamels and adhesive bonds. The coatings obtained are distinguished, for example, by enhanced toughness, especially ultimate strength.

The compositions of this invention can be mixed, at any stage before cure, with customary modifiers such as extenders, fillers and reinforcing agents, pigments, dyes, organic solvents, plasticisers, tackifiers, rubbers, accelerators or diluents. Illustrative of suitable extenders, reinforcing agents, fillers and pigments are: coal tar, bitumen, glass fibres, boron fibres, carbon fibres, cellulose, polyethylene powder, polypropylene powder, mica, asbestos, quartz powder, gypsum, antimony trioxide, bentones, silica aerogel ("aerosil"), lithopone, barite, titanium dioxide, carbon black, graphite, iron oxide or metal powders such as aluminium powder or iron powder. It is also possible to add other conventional modifiers to the curable compositions, for example flame retardants, thixotropic agents, flow control agents such as silicones, cellulose acetate butyrate, polyvinyl butyrate, waxes, stearates and the like (some of which may also be used as mould release agents).

If the compositions of this invention are used, for example, as adhesive formulations, it is also possible to add to them carboxy-terminated acrylonitrile/butadiene rubber, modifying resins such as triglycidyl-p-aminophenol, and accelerators such as boron trifluoride monoethylamine complexes or imidazole complexes.

The curable compositions can be prepared in conventional manner with the aid of known mixing equipment such as stirrers, kneaders, rollers and the like.

The compositions of this invention are very readily processable, have good solubility in customary organic solvents, good stability in the melt or in solution, as well as good thermal and mechanical properties of the products when cured, and in particular have excellent ultimate strength. The products obtained also have good electrical properties, high glass transition temperatures and are non-brittle. The compositions may also be readily used as melts, especially without the addition of non-volatile solvents, for example for impregnation.

Accordingly, the present invention also relates to the crosslinked, infusible products obtained by curing the compositions.

The compositions of this invention can be used in a variety of fields, for example in prepregs, laminates, composites, printed circuit boards, castings, mouldings, adhesives and coatings. A particularly interesting utility is for the fabrication of fibre-reinforced composites, which are, for example, of very great importance for the aerospace industry. Thus the modified resins can be used for preimpregnating various fibrous materials which are used as honeycomb skins or as structural parts. Methods of preparing prepregs are known to the skilled person. Fibrous materials which may be suitably used are graphite, glass and kevlar. Methods of making laminates are also known. Laminates of different thicknesses can be made, for example by compression moulding or autoclave moulding. The compositions of the invention may also be used with success as adhesion promoters.

The following Examples describe a number of preferred embodiments of the invention.

PREPARATION OF THE BISMALEIMIDES A-F

A solution of 1.0 mol of the appropriate diamine in 1000 ml of acetone is added dropwise at 0° C. over 1 hour to a solution of 216 g of maleic anhydride in 2000 ml of acetone. The reaction mixture is stirred for 2 hours at room temperature and then 780 ml of acetic anhydride, 90 ml of triethylamine and 14.4 g of nickel-(II) acetate tetrahydrate are added. After 20 hours at room temperature, about ⅔ of the acetone is distilled off under the vacuum and the residue is poured, with stirring, into 5 liters of water. The precipitate is isolated by filtration, washed repeatedly with water, and dried at 70° C. in a vacuum dried. The crude bismaleimide is isolated in this process in 90-100% yield.

TABLE 1

(bisimide structure: two maleimide-N-phenyl groups connected by CH$_2$, with substituents R$_1$, R$_2$, R$_3$, R$_4$ on each ring)

| Bisimide | R$_1$ | R$_2$ | R$_3$ | R$_4$ | melting point (DSC) | T$_A$ | T$_{max}$ | ΔH$_R$ |
|---|---|---|---|---|---|---|---|---|
| A | CH$_3$ | CH$_3$ | H | H | 204° C. | 220° C. | 281° C. | 118 J/g |
| B | CH$_3$ | C$_2$H$_5$ | H | H | 153° C. | 250° C. | 315° C. | 180 J/g |
| C | C$_2$H$_5$ | C$_2$H$_5$ | H | H | 165° C. | 240° C. | 311° C. | 190 J/g |
| D | (CH$_3$)$_2$CH— | (CH$_3$)$_2$CH— | H | H | 219° C. | 308° C. | 354° C. | 126 J/g |
| E | C$_2$H$_5$ | (CH$_3$)$_2$CH— | H | H | 178° C. | 260° C. | 315° C. | 137 J/g |
| F | C$_2$H$_5$ | C$_2$H$_5$ | Cl | H | 177° C. | 300° C. | 350° C. | 135 J/g |

*)Differential analysis using a TA 3000, available from Mettler AG, CH-Greifensee
T$_A$ = onset of reaction. T$_{max}$ = maximum peak temperature
ΔH$_R$ = integral heat of reaction

EXAMPLE 1

A mixture of 110 g of N,N'-4,4'-methylenebis(2-ethyl-6-methylphenylmaleimide) (bisimide B) and 66.5 g of o,o'-diallyl bisphenol A is fused at 150° C. The resultant mixture is still just liquid at room temperature and has a viscosity of η$_{120}$=140 mPa.s. The resin is readily soluble in, for example, toluene, xylene, acetone, methyl ethyl ketone, methylene chloride and ethyl acetate. Differential thermoanalysis shows that the reaction onset T$_A$ of the reaction mixture is at 160° C. and the maximum peak temperature T$_{max}$ is 270° C. The integral heat of reaction ΔH is 300 J/g.

The mixture is degassed for 15 minutes at 150° C., and the mobile resin is poured into a mould measuring 120×120×4 mm$^3$ and cured for 4 hours at 200° C., for 2 hours at 220° C. and for 6 hours at 250° C. After cooling, the transparent polymer sheet is cut to test bars, which are measured for the following properties:

| | |
|---|---|
| Tg onset[1] (TMA): | 281° C. |
| flexural strength according to ISO at 23° C.: | 144 MPa |
| edge fibre elongation according to ISO 179: | 24.7 kJ/m$^2$ |
| ultimate strength G$_{IC}$[2]: | 275 J/m$^2$ |
| 10% dynamic weight loss[3]: | 415° C. |

[1] Tg onset = point of intersection of the extended base line with the tangent at the calibration curve in the area of the steepest ascent (measured with TMA-943, DuPont 9900, thermoanalysis).
[2] Bend notch according to ASTME-399
[3] Heating up rate 10° C./min under nitrogen (determined with TG 50, Mettler TA 3000).

EXAMPLE 2

2 g of o,o'-diallyl bisphenol A and 3.1 g N,N',4,4'-methylenebis(2,6-dimethylphenylmaleimide) (bisimide A) are fused at 160° C. and degassed for 15 minutes. The clear, mobile resin is poured into a test tube and cured for 4 hours at 180° C., for 2 hours at 200° C. and for 6 hours at 250° C. A clear solid with a Tg onset of 285° C. is obtained.

EXAMPLE 3

2 g of o,o'-diallyl bisphenol A and 3.1 g of N,N',4,4'-methylenebis(2,6-diethylphenylmaleimide) (bisimide A) are fused at 140° C. and degassed for 15 minutes. The clear, mobile resin is poured into a test tube and cured for 4 hours at 180° C., for 2 hours at 200° C. and for 6 hours at 250° C. A clear solid with a Tg onset of 300° C. is obtained.

EXAMPLE 4

2 g of o,o'-diallyl bisphenol A and 3.1 g of N,N',4,4'-methylenebis(2,6-diisopropylphenylmaleimide) (bisimide D) are fused at 180° C. and degassed for 15 minutes. The clear, mobile resin is poured into a test tube and cured as described in Example 2. A clear solid with a Tg onset of 283° C. is obtained.

EXAMPLE 5

Following the procedure described in Example 1, a mixture of 110 g of bisimide B and 77 g of bisphenol A diallyl ether is prepared, cast to sheets and cured. The mouldings are tested for the following properties:
Tg onset: 301° C.
flexural strength: 93 MPa
edge fibre elongation: 3.2%
ultimate strength: 144 J/m$^2$.

EXAMPLE 6

Following the procedure described in Example 1, a mixture of 110 g of bisimide B and 84 g of bisphenol A o,o'-diallyldimethyl ether is prepared, cast to sheets and cured. The mouldings are tested for the following properties:
Tg onset: 184° C.
flexural strength: 132 MPa edge fibre elongation: 4.0%
ultimate strength: 281 J/m$^2$.

EXAMPLE 7

Following the procedure described in Example 1, a mixture of 110 g of bisimide B and 58 g of 3,3'-diallyl-4,4'-dihydroxydiphenyl is prepared, cast to sheets and cured. The mouldings are tested for the following properties:
Tg onset: 291° C.
flexural strength: 150 MPa
edge fibre elongation: 6.0%
ultimate strength: 235 J/m$^2$.

EXAMPLE 8

To prepare a low melting mixture, 50 g of bisimide B and 50 g of N,N'-4,4'-methylenebis(phenylmaleimide) are fused at 130° C. After cooling, a mixture which is vitreous at room temperature is obtained. This mixture softens at 50° C. and at 100° C. has a viscosity of 11 000 mPa.s.

EXAMPLE 9

100 g of the bismealeimide mixture of Example 8 and 68 g of o,o'-diallyl bisphenol A are fused at 100° C. and degassed for 15 minutes. The mobile mixture is then poured into a mould measuring 120×120×4 mm$^2$ and cured for 1 hour at 180° C., for 2 hours at 200° C. and for 6 hours at 250° C. The mouldings are tested for the following properties:
Tg onset: 302° C.
flexural strength: 159 N/mm$^2$
edge fibre elongation: 7.4%.

EXAMPLE 10

100 g of the bismaleimide mixture of Example 8, 50 g of o,o'-diallyl bisphenol A and 11.2 g of 2-allyleugenol are fused at 100° C. and degassed for 15 minutes. After curing as described in Example 9, the mouldings are tested for the following properties:
Tg onset: 300° C.
flexural strength: 132 MPa
edge fibre elongation: 4.9%

What is claimed is:
1. A curable composition comprising
(a) an aromatic bismaleimide of formula

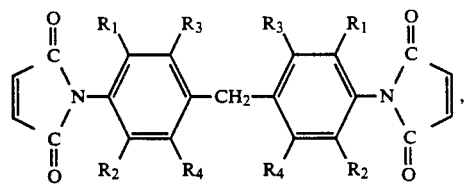

wherein R$_1$ and R$_2$ are identical or different and each is C$_1$-C$_4$alkyl, and R$_3$ and R$_4$ are each independently of the other a hydrogen or halogen atom, or a mixture of an aromatic bismaleimide of formula I and N,N'-4,4'-methylenebis(phenylmaleimide) in the molar ratio of 1:0.3 to 1.2, and
(b) an alkenyl phenol, and alkenyl phenol ether or a mixture thereof, with the proviso that the alkenyl moiety contains at least 3 carbon atoms.

2. A composition according to claim 1, comprising (a) an aromatic bismaleimide of formula I and (b) an alkenyl phenol, an alkenyl phenol ether or a mixture thereof, with the proviso that the alkenyl moiety contains at least three carbon atoms.

3. A composition according to claim 1, which contains 0.05 mole, preferably 0.5 to 1.2 mole, of component (b) per mol of component (a).

4. A composition according to claim 1, wherein R$_1$ and R$_2$ are each independently of the other methyl, ethyl or isopropyl, and R$_3$ and R$_4$ are each a hydrogen or a chlorine atom.

5. A composition according to claim 1, wherein R$_1$ and R$_2$ are each independently of the other methyl, ethyl or isopropyl, and R$_3$ and R$_4$ are each a hydrogen atom.

6. A composition according to claim 1, wherein component (a) is N,N'-4,4'-methylenebis(2-ethyl-6-methyl-phenylmaleimide).

7. A composition according to claim 1, wherein component (a) is a mixture of an aromatic bismaleimide of formula I and N,N'-4,4'-methylenebis(phenylmaleimide) in the molar ratio of 1:0.9 to 1.1.

8. A composition according to claim 1, wherein component (b) is an alkenyl phenol of formula II, III or IV

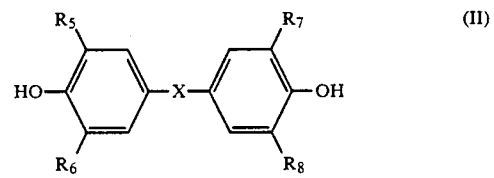

wherein X is a direct bond, methylene, isopropylidene, —O—, —S—, —SO—, —SO$_2$— or —CO—, and R$_5$, R$_6$, R$_7$ and R$_8$ are each independently of the other a hydrogen atom or C$_3$-C$_{10}$alkenyl, with the proviso that at least one of the substituents R$_5$ to R$_8$ is an alkenyl group,

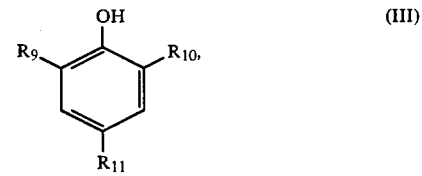

wherein R$_9$, R$_{10}$ and R$_{11}$ are each independently of the other a hydrogen atom or C$_3$-C$_{10}$alkenyl, with the proviso that at least one of the substituents R$_9$ to R$_{11}$ is an alkenyl group, or

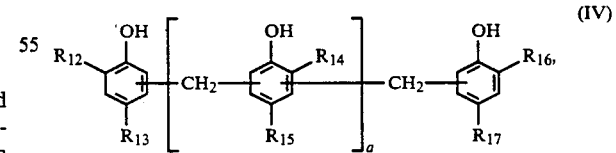

wherein R$_{12}$, R$_{13}$, R$_{14}$, R$_{15}$, R$_{16}$ and R$_{17}$ are each independently of the other a hydrogen atom, C$_1$-C$_4$alkyl or C$_3$-C$_{10}$alkenyl, with the proviso that at least one of R$_{12}$ to R$_{17}$ is alkenyl, and a is an integer from 0 to 10, or an ether of a compound of formulae II to IV which contains a R$_{18}$O radical instead of at least one OH group, where R$_{18}$ is C$_1$-C$_{10}$alkyl, C$_6$-C$_{10}$aryl or C$_3$-C$_{10}$alkenyl.

9. A composition according to claim 8, wherein the alkenyl group in formulae II to IV is allyl methallyl or propenyl.

10. A composition according to claim 8, wherein component (b) is an alkenyl phenol of formula II, wherein X is methylene, isopropylidene, —O—, —$SO_2$— or —CO—, $R_5$ and $R_7$ are each allyl and $R_6$ and $R_8$ are each a hydrogen atom.

11. A composition according to claim 8, wherein the alkenyl phenyl is o,o'-diallyl bisphenol A.

12. A mixture according to claim 1, comprising an aromatic bismaleimide of formula I and N,N'-4,4'-methylenebis(phenylmaleimide) in the molar ratio of 1:0.9 to 1.1.

13. A crosslinked, infusible product obtained by curing a composition as claimed in claim 1.

* * * * *